[11] 3,617,938

[72] Inventors Louis J. Denes
 Monroeville, Pa.;
 Patrick C. Ward, South Windsor, Conn.
[21] Appl. No. 34,234
[22] Filed May 4, 1970
[45] Patented Nov. 2, 1971
[73] Assignee United Aircraft Corporation
 East Hartford, Conn.

[54] POLARIZING LASER MIRROR
 5 Claims, 4 Drawing Figs.

[52] U.S. Cl. .................................................... 331/94.5,
 350/147
[51] Int. Cl. .................................................... H01s 3/08
[50] Field of Search .......................................... 331/94.5;
 350/147, 162

[56] References Cited
UNITED STATES PATENTS
3,248,660 4/1966 Fajans .......................... 331/94.5
3,443,243 5/1969 Patel ............................ 331/94.5

*Primary Examiner*—William L. Sikes
*Attorney*—Anthony J. Crisco

ABSTRACT: The surface of a laser mirror is formed with grooves to induce polarization of a laser energy incident therein, the plane of polarization being selective and reproducible. The dimensions and spacing of the grooves are a function of the wavelength of the laser energy.

PATENTED NOV 2 1971  3,617,938

INVENTORS
LOUIS J. DENES
PATRICK C. WARD
Melvin Pearson Williams
BY   ATTORNEY

POLARIZING LASER MIRROR

BACKGROUND OF THE INVENTION

1. Field of the Invention

This invention relates to lasers and more particularly to polarizing laser mirrors.

2. Description of the Prior Art

Lasers have an inherent characteristic of seeking the least lossy transfer mechanism during the process of converting energy from a lasing medium to a laser beam; laser beams usually are polarized soon after system startup due to this characteristic. The generation of a laser beam does not yield polarized energy due to any naturally occurring limitation, rather the inevitable interaction of the laser radiation with the environmental apparatus within the laser cavity causes this result. Polarized laser outputs are not necessarily undesirable; as a matter of fact, the contrary is usually true. It has been observed, however, that for a given optical cavity arrangement, the polarization of a laser beam will change with time due to small variations in alignment, temperature and the like, the direction of polarization appearing almost random thereby causing problems in the reproducibility of output beam characteristics and suggesting that a preselectable polarized output would be much more useful and desirable.

In general, the polarization of a laser beam results from the interaction between the beam and the structure causing the polarization and may occur either inside or outside of the optical cavity, preferably the former. Where accomplished inside the cavity, the system can be induced to generate laser energy with all of the electromagnetic energy polarized as it is released by the energized lasing molecules. Alternatively, if the laser beam is produced and the selective polarization step taken after the beam has left the cavity, energy not having the desired direction of polarization is rejected by the selective mechanism and lost; beam energy is then limited to those components of the original beam which coincide with the desired polarization.

There are three devices commonly used in the art to polarize lasers, namely, Brewster angle windows, wire grids and diffraction gratings; each of these has its advantages and disadvantages. Brewster angle windows are used very frequently and consist simply of a sheet of material of variable transparency with respect to energy of a given wavelength, the degree of transparency for the horizontal and vertical components of polarization of the energy being a function of the angle of incidence of the energy upon the sheet. This phenomenon is illustrated in the graph shown on page 511 of Jenkins, F. A. White, H. F. *Fundamental of Optics*, McGraw-Hill, 1957, 3rd Ed. There is one angle, the Brewster angle, at which the reflectance for the incoming light for one direction of polarization is zero, i.e., the transmissivity is maximum. The magnitude of this angle depends upon the index of refraction of the window material and the wavelength of the incoming radiation. To induce polarization a window is placed in an optical cavity at the Brewster angle, thereby allowing the described selective loss mechanism to preferentially transmit light of a particular polarization and partially reject light of the nonselected polarization. After the light in the optical cavity has oscillated for several paths, perhaps three or four, the preferred polarization direction becomes dominant within the cavity and the laser will oscillate in this preferred polarization.

In a typical Brewster angle window arrangement, about four to six percent of the energy in the nonpreferred direction is rejected by the window in the form of reflection while the energy polarized in the acceptable window direction passes essentially uninhibited. In a laser application, there are only several passes through the window before complete polarization occurs and from an efficiency standpoint Brewster angle windows are acceptable. By way of comparison, in the polarization of ordinary white light, approximately 10 successive windows at the Brewster angle would be required before sufficient polarization occurs; this is undesirable and inefficient since there would be a rejection of approximately one half of the light which was passing through the window system.

Although windows set at the Brewster angle are efficient and effective at laser cavity polarization, the introduction of such windows into the optical cavity of some gas lasers causes other problems. Since the window is not a mirror, the lasing medium, together with the associated Brewster angle windows, must be placed within an optical cavity (generally two mirrors) in order to form an overall laser system. Often such an arrangement results in a region of atmospheric air between each window and the nearby cavity mirror. The presence of air is undesirable because variations in the characteristics of the air due to changes in temperature, pressure, humidity, etc., introduce possible variations in the characteristics of the laser. Further, since optical cavities require precise alignment of the mirrors and since any reflecting or transmitting surfaces are possible loss mechanisms, the placement of any windows between the mirrors and the laser medium is generally undesirable; therefore, the mirrors are often fastened directly to the lasing medium through a bellows attachment. The bellows serves two purposes, namely, the sealing of the region between the windows and the mirrors from the surrounding environment, and the allowing of the mirrors to be moved, within certain limits, sufficient to permit proper alignment of the optical cavity.

To avoid the shortcomings of Brewster angle windows, wire polarizers have been used successfully in lasers; such polarizers can be categorized into large wire and small wire devices. The large wire polarizer has a wire diameter greater than the wavelength of the incident laser energy. The large wire device specularly reflects the light polarized in the direction parallel to the length of the wire, scattering much of this energy out of the cavity and inducing the laser to assume a condition having a polarization in the direction normal to the length of the wire. This selectively occurs quickly and relatively little of the total laser energy is lost from the laser cavity in the process. However, large diameter wires have a sufficiently large (one or two wavelengths) diameter that they are resolvable by the laser energy polarized orthogonal to the length of the wire. As a result, the wires partially reflect (thereby removing energy of the desired polarization from the cavity) and also absorb beam energy, becoming heated. A small wire polarizer is one having a wire diameter less than the wavelength of the laser incident energy. It has been found that such polarizers avoid the described heating problem, however, such devices are extremely fragile, and difficult to produce and handle. Overall, the wire polarizer is difficult to align, unable to withstand high-flux densities, easily distorted, fragile, and perhaps most importantly in some applications, the wire polarizer has the very great disadvantage of providing an output beam with no guarantee of reproducibility of the plane of polarization.

A diffraction grating can be a very suitable polarizing device in addition to performing its primary function as a wavelength selector. The diffraction grating allows the lasing line of interest to be selectively emitted and to selectively preclude other close but unwanted lasing lines. These gratings, however, have disadvantages; they are expensive and their reflectivity is poor, being more lossy than any of the alternate schemes for polarization already discussed. The functioning of a grating in polarizing light is similar to the wire device although as a practical matter the grating appears as a fully reflecting mirror forming one end of the optical cavity. Obviously, the grating avoids any of the complications inherent in the Brewster angle window and wire device arrangements, since each involve introducing additional components into the laser cavity. Diffraction gratings made of metal are relatively expensive since they are individually scribed, a process requiring elaborate and precise equipment. Although replica diffraction gratings can be made at a much lesser price, they are typically formed of plastics unable to withstand the high optical fluxes inherent in the laser oscillators and therefore cannot be used in laser applications. In operation there is uneven heating in the plastic replica diffraction grating resulting substantially from the inability to adequately cool the substrate plastic.

SUMMARY OF THE INVENTION

A principal object of the present invention is to selectively induce a predetermined direction of polarization in the laser energy in an oscillator cavity thereby providing polarized output.

According to the present invention, the surface of a laser oscillator mirror is scribed with grooves having dimensions related to the wavelength of the laser energy produced in the cavity, the grooves being positioned to introduce into the cavity a reflection loss mechanism having a preselected direction, said loss mechanism dominating all other optical losses in the cavity and being of sufficient magnitude to induce the cavity to produce laser energy completely polarized in the direction determined by the scribed grooves.

An advantage of the present invention is the ability to polarize laser radiation into a preselectable plane of polarization. Further, this method is considered desirable due to the simplicity of the production method. The polarizing surface is easily controlled when the groove markings are formed upon it, and the system is relatively insensitive to power flux incident upon the grooves during operation. This invention combines the simplicity of the wire polarizer plus the effectiveness of a diffraction grating to provide a superior system for causing selective polarization of a laser beam as it is being generated in an oscillator.

The foregoing and other objects, features and advantages of the present invention will become more apparent in the light of the following detailed description of a preferred embodiment thereof, as illustrated in the accompanying drawing.

DESCRIPTION OF THE PREFERRED EMBODIMENT

Polarization devices of the type to be described herein have application in various lasers having different wavelengths. While it will become apparent that the detailed dimensions of these polarizers will necessarily vary according to the wavelength of the laser energy, the mirrors described are with reference to a carbon dioxide gas laser operating at a wavelength of 10.6 microns; this association is made for convenience and the description of the preferred embodiment and should not be considered as limiting the scope of the invention in any manner.

Figure 1:
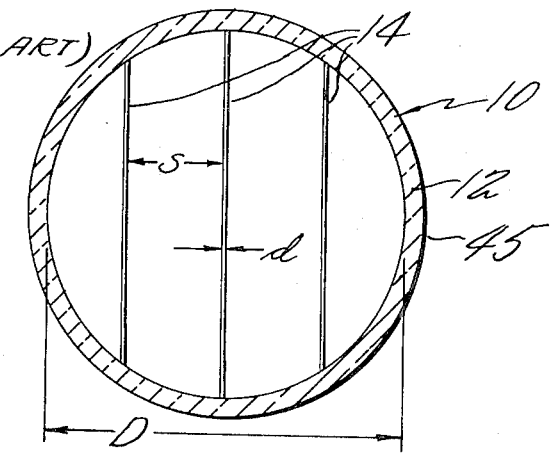
FIG. 1 is a sectioned, front elevation view of a wire polarizer device known to the prior art.

A typical wire polarizer 10 of the type known in the prior art is shown in FIG. 1. The complete device consists of a thin circular ring or disk 12 having a inside diameter D sufficiently large to pass the desired diameter of the laser beam and having an outside diameter at least sufficient to give reasonable structural integrity to the disk. Attached to the ring 12 is a plurality of fine wires 14, the wires of diameter $d$, arranged in parallel alignment at a separation distance $s$, each wire having each of its ends attached permanently to the ring 12. Devices such as the wire polarizer 10 have been used in carbon dioxide laser systems to produce a polarized output beam, however, this type device has been found to be relatively inefficient. For example, when three wires arranged in the manner described on a disk having an inside diameter D of approximately 5,000 microns, a spacing, $s$, between the wires of 1,000 microns and a wire diameter $d$ of 25 microns were introduced into the laser system shown in FIG. 2, the wire polarizer 10 reduced the output beam from 6 to 3 watts. The laser system 30 shown in FIG. 2 includes a pair of mirrors 32, 33, the mirror 33 having an aperture 34 of about 2,800 microns and serving as a coupling mirror through which the laser output radiation 35 is transmitted. The mirrors 32, 33 are approximately 2 ½ centimeters in diameter and are spaced about 50 centimeters apart from each other. Energy input to the laser is from an electric discharge 36 which is maintained between electrodes 38, 40. A pair of bellows 42, 44 connect a laser cavity enclosure 45 to the support apparatus of the mirrors 32, 33, and allow alignment of the mirrors through manipulation of control pins 46, 48. The output mirror 33 is edge cooled to ensure thermal stability. The nontransmitting mirror 32 is a curved substrate of copper, coated with gold.

The phenomenon of metallic reflectivity is due to currents induced in the metal by incident electromagnetic waves and these currents give rise to a reflected wave. If a plane polarized beam of electromagnetic radiation is normally incident on a metal, the induced current will have the same frequency as the incident wave and the direction of the current will lie in the same plane or direction as the electric vector of the polarized beam. This is the case of ordinary metallic reflection.

A case of special interest occurs if the size of the metal reflector becomes comparable with or even appreciably less than the wavelength of the incident radiation; the reflectivity (more properly, the effective scattering ability) depends very strongly on the relative size of the reflector in comparison with the wavelength of the incident radiation. This dependence of reflectivity on the size of the reflector is developed in a theoretical analysis of the scattering of radiation from small metallic spheres in Chapter 13 of Born, M. and Wolf, E., *Principles of Optics*, Pergamon Press, 1965, 3rd Ed., in which the percent reflectivity of the metal spheres is shown to decrease drastically with decreasing size. A convenient physical interpretation of this effect is to consider that the induced currents set up in a reflector by the incident electric wave have difficulty establishing themselves in a metal whose dimensions are appreciably smaller than the wavelength of the incident radiation. Therefore, the reflectance of a metal is reduced if the material dimensions are very small.

In terms of a practical polarizer consisting of thin metal strips (or wires), currents are established by the incident radiation, the direction of the currents lying in the plane of the electric vectors of the incident wave. For electric vectors that are parallel to the long dimension of the wires, the induced currents are easily established in the wires since the wires are easily established in the wires since the wires are many thousands of wavelengths long, thus the wires for this polarization have high reflectivities. Alternately, for electric vectors of the incident wave that are in the orthogonal direction, the induced current and the associated reflected radiation are much less, due to the thinness of the wire. Therefore, radiation with a polarization such that the electric vector is orthogonal to the long dimension of the wires is reflected less efficiently.

The polarization mechanism of a wire device is straightforward; laser energy having a polarization vector parallel to the direction of the wire is specularly reflected by the wires and much of this specularly reflected energy leaves the optical cavity. Laser energy having a polarization vector normal to the long dimension of the wires (senkrecht) undergoes less reflection from the wires since the wire diameter is approximately twice the wavelength of the incident radiation. This selective reflection by the wires induces the laser to assume the least lossy type oscillation and therefore a polarized beam with the polarization vector normal to the long direction of the wires. During the use of the wire device shown in FIG. 1 in the laser device shown in FIG. 2, it was found that a sufficient amount of the 10.6-micron carbon dioxide laser energy was interacting with the wires 14 to cause the wires to heat. The heating resulted in both a distortion of the wires and an overall net reduction in the laser output power. To avoid these problems, attempts were made to reduce the diameter of the wires 14 to less than the wavelength (10.6 microns) of the incident radiation. It was found however, that the resulting polarizer had wires that were extremely thin and difficult to handle and align.

Figure 2:
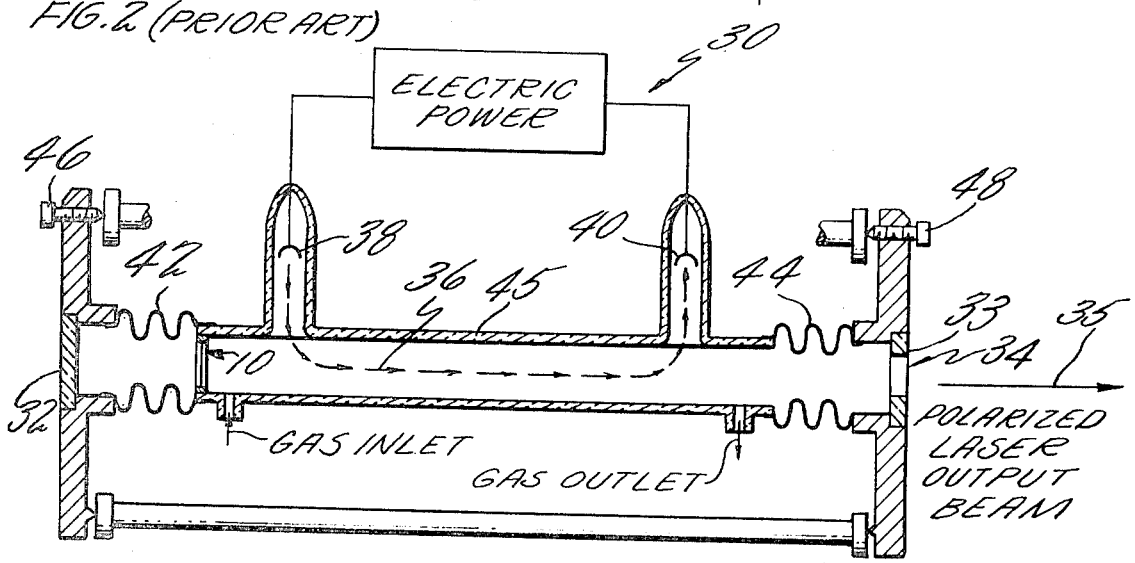
FIG. 2 is a schematized, side elevation view of a gas laser device, known to the prior art, incorporating a wire polarizer device.
Figure 3:
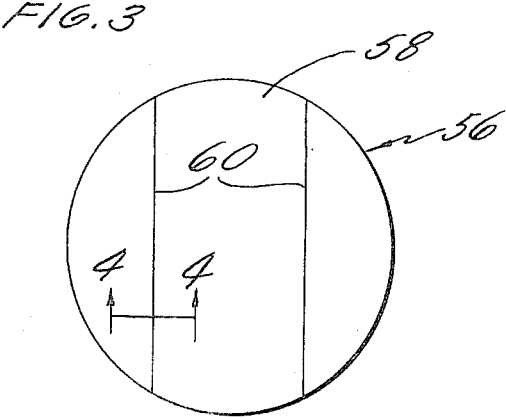
FIG. 3 is a front elevation view of a laser mirror having scribed grooves in accordance with the present invention.
Figure 4:
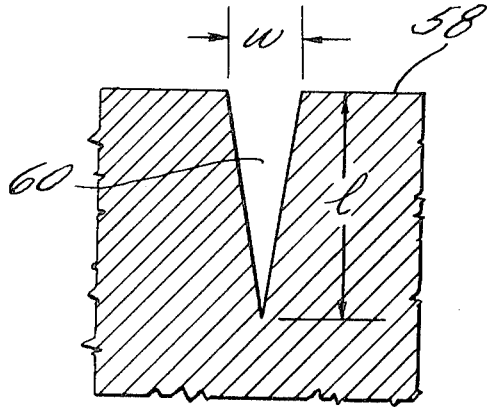
FIG. 4 is a broken away sectional view along line 4—4 of FIG. 3.

In accordance with the present invention, a scribed polarizing mirror 56 shown in FIG. 3 has been developed. The surface 58 of mirror 56 has scribed grooves 60 shown in more detail in FIG. 4 for the case of a 10.6 micron laser in which the grooves 60 have a width $w$ of approximately 4 microns and a depth $l$ of approximately 25 microns. This mirror may be used, inter alia, in a laser system of the type illustrated in FIG. 2 by substituting it for the mirror 32 and removing the wire polarizer 10.

The polarization mechanism of the grooved surface is different than that previously described for a wire device. The grooved surface preferentially reflects radiation polarized in a direction perpendicular to the groove until the laser has oscillated a sufficient number of times to assume the least lossy oscillation and completely assume a polarization parallel to the grooves. At this point the laser oscillates as though the scribed surface were smooth.

When the device shown in FIG. 3 has been used in an operating laser cavity very similar to that shown in FIG. 2, the laser power output was increased by a factor of two over the same cavity run with a wire polarizer. The mirror used had two parallel lines scribed on its surface, however, more lines are possible; the greater the number of lines the greater the perturbation introduced into the lasing medium. Similarly, a lesser number of lines might be used although, if the total grooving is of insufficient length, there may not be enough selective loss to cause the desired polarization. Specifically, in the design of the grooves, the total length should be at least twice the diameter of the burn spot (diameter of the lasing mode at the surface of the grooved mirror) on the mirror surface having grooves scribed thereon. Minimum spacing between any two of the parallel surface grooves should be many wavelengths; a separation of one hundred wavelengths has been found satisfactory. Also, the width $w$ should be less than approximately one-quarter of the wavelength of the laser radiation, and preferably much less. The narrower the groove, the greater the number of grooves that will be needed to cause the desired polarization; however, it is preferable to have several narrow lines rather than a fewer number of wider lines. The depth $l$ of the scribed groove should be more than a wavelength and preferably more than one wavelength (of the order of a quarter of a wavelength), the mirror surface including the scribed rules will act as a specular reflector and may not have a polarizing effect on the laser cavity radiation. It should be apparent that, as the wavelength of the laser energy increases, the precision and difficulty required in the preparation of the polarization mirror is decreased.

Although the invention has been shown and described with respect to but one preferred embodiment thereof, it should be obvious to those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. An optical cavity adapted to contain a suitably energized laser medium to provide an output beam of laser energy having a desired wavelength, said cavity comprising:
   a pair of mirrors having a spacing therebetween which causes the optical cavity to be resonant at said desired wavelength;
   a first mirror of said pair of mirrors being a coupling mirror which transmits laser energy from said cavity; and
   a second mirror of said pair of mirrors having grooves which are less than said desired wavelength in width and greater than said desired wavelength in depth, said grooves being mutually parallel to one another and separated by a distance of at least 100 times said desired wavelength, said second mirror preferentially supporting the generation of laser energy which is polarized along one of two mutually orthogonal directions with one of said orthogonal directions parallel to said grooves, the total length of said grooves being sufficient to cause said output beam to become substantially completely polarized in a preferred direction.

2. The cavity according to claim 1 wherein each of said grooves has a width no greater than one-half of said wavelength and a depth of no less than two wavelengths.

3. The cavity according to claim 2 wherein each of said grooves has a width no greater than one-quarter of said wavelength and a depth no less than five wavelengths.

4. In a carbon dioxide laser optical cavity providing an output beam of laser energy and including at least an output coupling mirror and a second, fully reflecting mirror, said mirrors having a lasing medium disposed therebetween and forming a laser oscillator region, the improvement in said reflecting mirror comprising:
   said reflecting mirror having a plurality of parallel grooves formed in the surface thereof, said grooves having a total cumulative length greater than twice the diameter of the lasing mode of said output beam, a width of approximately 4 microns, a depth of approximately 25 microns and minimum spacing between parallel grooves of approximately 1000 microns.

5. An optical cavity according to claim 1 wherein the total length of said grooves is at least twice the diameter of the lasing mode of said laser beam at the surface of said second mirror.

* * * * *